Nov. 29, 1966 — E. J. SCHAEFER — 3,289,018
SECURING OF ELECTRIC MOTOR END MEMBERS
Filed May 6, 1964
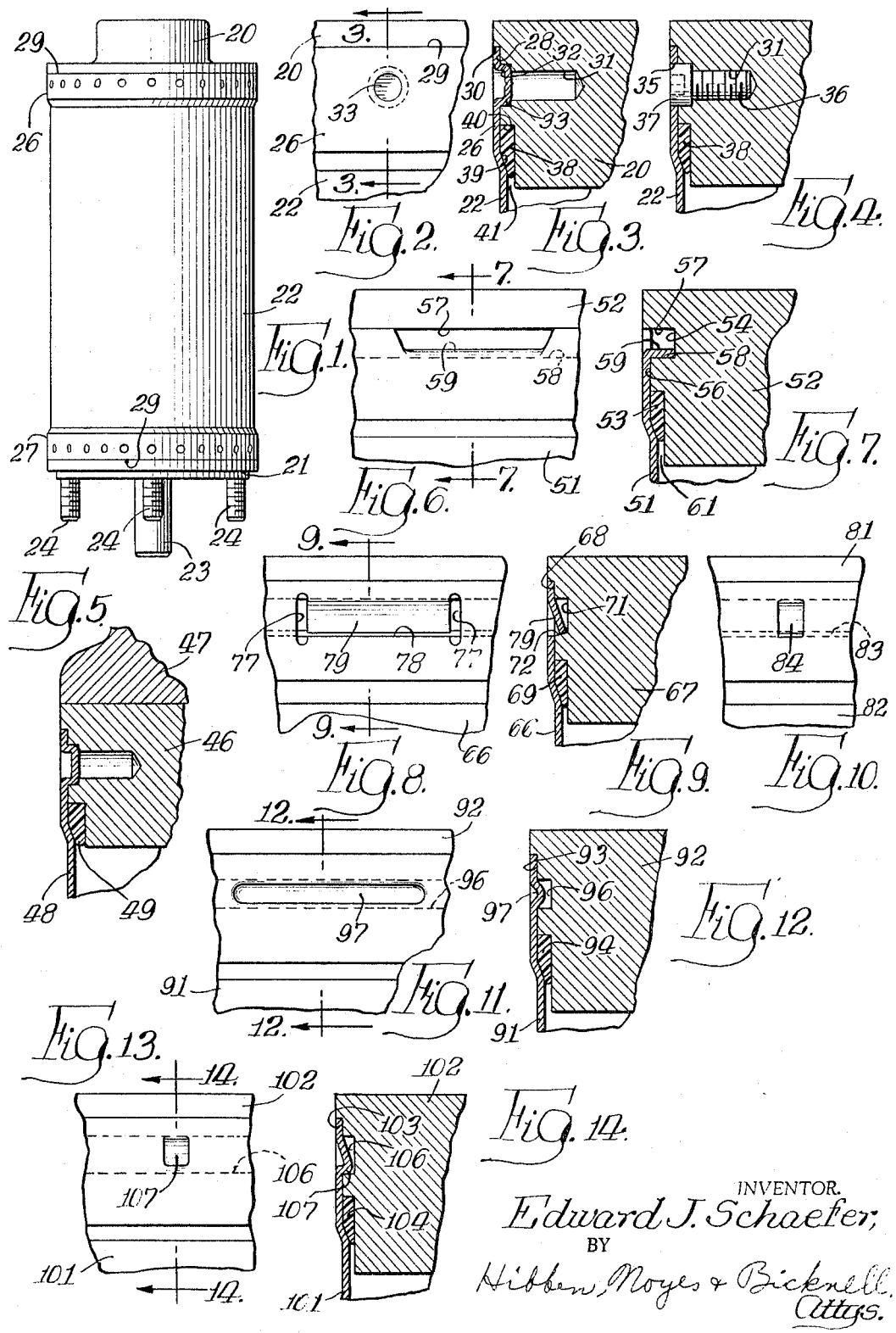
INVENTOR.
Edward J. Schaefer,
BY
Hibben, Noyes & Bicknell
Attys.

United States Patent Office 3,289,018
Patented Nov. 29, 1966

3,289,018
SECURING OF ELECTRIC MOTOR END MEMBERS
Edward J. Schaefer, Bluffton, Ind., assignor to Franklin Electric Company, Inc., Bluffton, Ind., a corporation of Indiana
Filed May 6, 1964, Ser. No. 365,282
11 Claims. (Cl. 310—42)

This invention relates to electric motors, and more particularly to an electric motor having an improved frame construction.

A frame for an electric motor usually includes a pair of axially spaced end members and an outer tubular shell which is coaxial with and extends between the end members. Each end member may comprise a single part or an end ring and an end bell. The end members rotatably support the rotor of the motor and the shell encloses the stator and the rotor of the motor. One method of securing the shell to the end members has been to deform or roll the end edges of the shell into circumferential grooves formed in the end members. Such a construction is satisfactory where an inexpensive mechanical connection between the end members and the shell is the only requirement. This construction has not heretofore been satisfactory, however, where, in addition to mechanical holding, an air or liquid tight seal between the end members and the shell is required and where accurate positioning of the end members on the shell is required for accurate alignment of the rotor shaft bearings mounted in the end members. Another method of securing the shell to the end member is by welding, which provides a seal therebetween, but such welding is expensive.

Accordingly, it is an object of this invention to provide an improved frame construction for an electric motor, wherein the shell and the end members of the frame are secured together by deforming them into interlocking engagement.

Another object is to provide apparatus of the foregoing character, in which each end member may comprise a single part or an end ring and an end bell.

It is another object to provide apparatus of the foregoing character, wherein the end members and the shell may be accurately located with respect to each other.

Still another object is to provide apparatus of the foregoing character, wherein an air or liquid tight seal is also provided between the shell and the end members, the apparatus being relatively inexpensive to manufacture.

Other objects and advantages of the invention will become apparent from the following description taken in conjunction with the accompanying figures of the drawing, in which:

FIG. 1 is a side elevational view of an electric motor embodying the invention;

FIG. 2 is an enlarged fragmentary view of a portion of the structure shown in FIG. 1;

FIG. 3 is a sectional view taken along the line 3—3 of FIG. 2;

FIG. 4 is a view similar to FIG. 3 but showing the structure of FIG. 3 after modification;

FIG. 5 is a view similar to FIG. 3 but showing an alternative form of the invention;

FIGS. 6 and 7 are views respectively similar to FIGS. 2 and 3 but showing still another alternative form of the invention;

FIGS. 8 and 9 are views respectively similar to FIGS. 2 and 3 but showing still another alternative form of the invention;

FIG. 10 is a view similar to FIG. 2 but showing still another alternative form of the invention;

FIGS. 11 and 12 are views respectively similar to FIGS. 2 and 3 but showing still another alternative form of the invention; and FIGS. 13 and 14 are views respectively similar to FIGS. 2 and 3 but still showing still another alternative form of the invention.

In general, a frame for an electric motor embodying the invention comprises a shell member and at least one end member, one of the members having an opening formed therein and the other of the members having an end portion positioned in the opening. The overlapping or radially adjacent portions of the two members are deformed into rigid interlocking engagement to secure the two members together, and the two members are provided with abutting machined surfaces for accurately locating the two members relative to each other. The deformation to effect the rigid interlocking is preferably as spaced intermittent points. Further, a seal made of a resilient relatively non-compressible material is positioned between the two members, and the seal is pressed and distorted by surface portions of the two members and thereby provides an effective air and liquid tight seal between the members without affecting the accurate relative location of the members.

In FIG. 1 is shown an electric motor, which may be of the submersible type, comprising upper and lower end members 20 and 21, respectively, and a tubular generally cylindrical shell 22. The end members 20 and 21 are positioned in axially spaced apart relation and contain bearings which support a rotor (not shown) having a rotor shaft 23. The shaft 23 extends downwardly from the motor through the lower end member 21 for connection to a unit (not shown) to be driven by the motor. Studs 24 may also be secured to the lower end member 21 and extend downwardly therefrom for the purpose of securing the motor to the driven unit. The motor of course also contains a stator, and it may contain other components such as a thrust bearing, all of which may be of a conventional construction.

The upper and lower end portions 26 and 27 of the shell 22 are flared outwardly and are positioned within rabbets 28 (FIG. 3) formed in the end members 20 and 21. The end surfaces 29 of the shell are formed, as by machining, such that at least portions of the surfaces 29 are exactly perpendicular to the axis of the shell, and the rabbets 28 of the end members are formed such that the bearings carried by the end members 20 and 21 are in exact axial alignment when the end surfaces 29 of the shell are in metal-to-metal contact with the radial longitudinally outer surface 30 of the rabbets 28.

In the form shown in FIGS. 2 and 3, before assembly of the shell 22 and the end member 20, a plurality of circumferentially spaced radially extending holes 31 are drilled into the outer periphery of the end member 20. A cylindrical countersink 32 is formed for each hole 31. Before assembly of the shell 22 with the end member 20, the flared end portion 26 of the shell is smooth and imperforate. After assembly of the shell 22 and the end member 20 by relative axial movement of the two members toward each other until the end surface 29 of the shell 22 engages the radial surface 30 of the rabbet 28, a crimping or deforming operation is performed on the flared end portion 26 of the shell 22 whereby the portions 33 of the shell overlying the countersinks 32 are forced inwardly into the countersinks 32. The crimping operation is such that the portions 33 tightly engage the wall surfaces of the countersinks 32 and thus prevent longitudinal movement of the end member 20 out of the shell 22. The end surfaces 29 of the shell 22 engage the radial surfaces of the rabbet 28 and thus prevent longitudinal movement of the end member into the shell.

In the event it later becomes necessary to repair or service a component of the motor located within the shell and it is necessary to separate the shell 22 from the end member 20, this may be accomplished by drilling out each deformed portion 33 of the shell to form a relatively smooth walled hole 35 having the same diameter as the associated countersink 32, and deepening the countersinks. Before reassembly of the end member 20 and the shell 22 the holes 31 are tapped and after the end member 20 is reinserted into the shell 22 and the surfaces 29 and 30 are moved into abutment, bolts 36 (FIG. 4) are inserted through the holes 35 and threaded into the holes 31. The bolts 36 preferably have a cylindrical head 37 which fits snugly in the holes 35 of the shell 22 and the countersinks 32. The bolts 36 thus prevent separation of the end member 20 from the shell 22 and the motor may be returned to operation, and the end surface 29 of the shell 22 again engages the radial surface 30 of the rabbet 28 of the end member 20 to ensure alignment of the bearings of the motor.

In the event it is desired to provide an air or liquid tight seal between the end member 20 and the shell 22, a seal space may be formed at a location which is preferably spaced axially toward the longitudinal center of the motor from the locations of the deformations 33, and a seal 38 (FIG. 3) made of a resilient relatively non-compressible material may be positioned in the seal space. The seal space is formed by the flaring of the end portion 26 of the shell, which flaring forms an inner surface portion 39 on the shell having a sloped or lateral direction component. A circumferential recess is formed in the outer periphery of the end member 20, the recess forming a lateral surface 40 which is spaced longitudinally toward the end of the motor from the lateral surface 39 of the shell.

Before assembly of the end member 20 and the shell 22, the seal 38, which is in the form of an O-ring and preferably has a square or rectangular cross section, is preferably positioned in the circumferential recess of the end member 20 adjacent the lateral surface 40. During relative axial movement of the end member 20 and the shell 22 into abutting assembled relation, the lateral surface portions 39 and 40 press and distort the seal 38 between them, and the dimensions of the seal relative to the dimensions of the seal space are preferably such that the seal completely fills the seal space and is tightly held by the lateral surface portions 39 and 40.

To permit excess seal material to escape in the event the seal 38 more than fills the seal space, a clearance space, indicated by the numeral 41, is provided between the end member 20 and the shell 22 at a location which is spaced longitudinally inward of the seal 38. The clearance space 41 is in communication with the seal space, and a portion of the seal 38 may flow into the clearance space 41 if necessary. Since provision is made for excess seal material to escape, there is no danger that the seal will completely fill the seal space and that the non-compressible nature of the seal material will prevent the end surface 29 of the shell 22 from being moved into metal-to-metal contact with the radial surface 30 of the rabbet 28, which as previously explained is desirable for accurate alignment of the bearings of the motor. The location of the seal relative to the deformed portions 33 of the shell is also advantageous because any breaks in the shell caused by the crimping operation will be spaced longitudinally toward the end of the shell from the seal and thus leakage of air or liquid into the interior of the motor between the end member 20 and the shell 22 will not be possible.

Of course, the lower end member 21 may be secured to the shell 22 in exactly the same manner as the connection between the shell 22 and the upper end member 20, or they may be secured together in some other manner if desired.

FIG. 5 shows a motor construction wherein the end member comprises an end ring 46 and an end bell 47. The motor shown in FIG. 5 also includes a shell 48 similar to the shell 22 and an O-ring seal 49 similar to the seal 38. The shell 48 may be secured to the end ring 46 in exactly the same manner described above for the connection of the shell 22 to the end member 20 and the end bell 47 may be secured to the end ring 46 by conventional means, such as by bolts, welding, etc. Any of the constructions for securing the shell to an end member hereinafter described could be used with a motor having an end ring and an end bell.

The motor construction shown in FIGS. 6 and 7 also includes a shell 51, an end member 52 and an O-ring seal 53 which may be respectively similar to the members 22, 20 and 38 shown in FIGS. 1 to 3. The shell 51 is secured to the end member 52 by forming, before assembly of the motor, a circumferential recess or groove 54 in the outer periphery of the end member 52. The groove 54 thus forms a longitudinally outer radial surface 57 and an inner radial surface 58, and the surface 57 also forms the longitudinally outer surface of a rabbet 56 which receives the end portion of the shell 51.

During assembly of shell 51 and the end member 52, they are moved relative to each other in an axial or longitudinal direction until the end surface of the shell 51 engages in metal-to-metal contact the outer surface 57 of the groove 54, and then a crimping or deforming operation is performed on the shell 51 to bend radially inward, at circumferentially spaced locations, sections 59 of the shell 51 into tight engagement with the inner radial surface 58 of the recess 54. The sections 59 are formed by longitudinally shearing or cutting the shell 51 from its outer end at circumferentially spaced points and forcing the portions of the shell between adjacent cuts radially inward. The turned in sections 59 of the shell 51 tightly engage the surface 58 of the groove 54 and prevent longitudinal movement of the end member 52 out of the shell 51, and the engagement of the outer end surface of the shell 51 with the outer surface 57 of the groove 54 prevents longitudinal movement of the end member 52 into the shell 51. Further the engagement of the end surface of the shell 51 with the outer surface 57 again ensures accurate alignment of the bearings of the motor.

The seal 53 is positioned in a seal space provided between the shell 51 and the end member 52 and prevents leakage of air or liquid between the shell and the end member after assembly. The seal space between the shell 51 and the end member 52 may be formed in exactly the same manner as the seal space for the seal 38 of FIGS. 1 to 3. A clearance space 61 for excess seal material to escape is provided so that the shell and the end member cannot be prevented from making metal-to-metal contact.

The construction shown in FIGS. 8 and 9 also includes a shell 66, an end member 67 having a rabbet 68 formed therein, and an O-ring seal 69 positioned between the end member 67 and the shell 66, the members 66, 67 and 69 being generally similar to the members 22, 20 and 38 shown in FIGS. 1 to 3. A circumferential groove or recess 71 is again formed in the outer periphery of the end member 67 but at a location spaced longitudinal or axially inward from the outer end surface of the rabbet 68. The longitudinally inward surface 72 of the groove 71 preferably tapers or slopes radially inward and longitudinally outward from the outer periphery of the end member 67, as shown in FIG. 9.

The groove 71 is of course formed in the end member 67 before assembly of the shell 66 and the end member 67, and also before assembly, the shell 66 is sheared or axially slotted as at 77 at a plurality of circumferentially spaced locations. A circumferential shear is also formed between adjacent pairs of the slots 77, the circumferential shears being indicated by the numeral 78, and preferably also being formed before assembly of the shell and end member.

After movement of the shell 66 and the end member 67 into abutting relation with the seal 68 in place between them, the sections 79 of the shell 66 between the longitudinal shears or slots 77 are bent inwardly to cause the longitudinally inward edges of the sections 79 to tightly engage the sloped surface 72 of the groove 71, and thus secure the shell 66 tightly to the end member 77.

The construction shown in FIG. 10 is generally similar to that shown in FIGS. 8 and 9 and comprises an end member 81 and a shell 82, the end member 81 having a circumferential groove 83 formed therein similar to the groove 71. An O-ring seal (not shown) is also preferably provided. Instead of shearing the shell 66 before assembly of the end member 67 and the shell 66, as in FIGS. 8 and 9, by the use of a proper crimping or shearing tool, sections 84 of the shell 82 are crimped inwardly at a plurality of circumferentially spaced locations after assembly of the shell and the end bell. Since the sections 84 are bent without a prior shearing operation, it is preferred that the circumferential dimension of the sections 84 be less than that of the sections 79 in order to simplify the deforming operation.

In the forms shown in FIGS. 8 to 10, the O-ring seals are of course spaced longitudinally inwardly from the locations of the deformed sections 79 and 84 so that the deformations will not result in leakage of air or liquid into the interior of the motor, as previously explained.

The construction shown in FIGS. 11 and 12 also comprises a shell 91, an end member 92 having a rabbet 93 formed thereon, and an O-ring seal 94, the members 91, 92 and 94 being generally similar to the members 22, 20 and 38 shown in FIGS. 1 to 3. Before assembly of the shell and end member, a circumferential groove 96 is formed in the outer periphery of the end member 92 at a location spaced longitudinally inward from the outer end surface of the rabbet 93, and after the shell 91 and the end member 92 are moved into assembled relation, circumferentially spaced sections 97 of the shell 91 are rolled or otherwise forced into the groove 96. The inner periphery of the shell 91 at the sections 97 tightly engage the radially outer corners of the groove 96, and thus the shell 91 and the end member 92 are held in tightly secured assembled relation.

The construction shown in FIGS. 13 and 14 is very similar to that shown in FIGS. 11 and 12, and again comprises a shell 101, an end member 102 having a rabbet 103 formed in its outer periphery, and an O-ring seal 104, the members 101, 102 and 104 being respectively similar to the members 91, 92 and 94 shown in FIGS. 11 and 12. Before assembly of the shell and the end member, a circumferential groove or recess 106 is again formed in the outer periphery of the end member 102 at a location spaced longitudinally inward from the outer end of the rabbet 103, and after assembly of the shell and end member circumferentially spaced sections 107 of the shell are forced into the groove 106. In the construction shown in FIGS. 11 and 12, the sections 97 were rolled into the groove 96 such that the location of greatest deformation is centrally located between the longitudinally inner and outer surfaces of the groove 96, whereas in FIGS. 13 and 14 the sections 107 are forced tightly in overlapping engagement over the inner longitudinal surface of the groove 106.

From the foregoing description it will be apparent that a novel and improved frame construction for an electric motor has been provided. The invention provides a relatively inexpensive means for tightly securing the shell to the end members while nevertheless providing metal-to-metal abutment surfaces of the shell with the end members to obtain accurate alignment of the bearings of the motor. Still another feature of the invention is that an effective seal is provided between the shell and the end members, which cannot prevent the shell from being moved into abutting relation with the end members.

I claim:
1. In an electric motor construction including a stator and a rotor, a frame for housing and supporting the stator and the rotor comprising a tubular shell member and at least one end member, said end member having a portion positioned in an end of said shell member, said shell member and said end member including substantially lateral abutting surfaces for accurately locating said members longitudinally relative to each other, and said shell member being deformed into rigid interlocking engagement with said end member at intermittent spaced locations, said abutting surfaces comprising the end surface of said shell member and a lateral shoulder on said end member, and said interlocking engagement of said members including at least one recess formed in the outer periphery of said portion of said end member, the axially inner surface of said recess being spaced axially inwardly from said shoulder, and said shell member including a portion deformed into tight engagement with said inner surface of said recess.

2. A frame as in claim 1, wherein a plurality of recesses are formed in said end member at circumferentially spaced locations, and said shell member is deformed into each of said recesses.

3. A frame as in claim 2 wherein each of said recesses comprises a counterbored hole.

4. A frame as in claim 1, wherein said recess comprises a groove formed around the outer periphery of said portion of said end member, and said shell being deformed into said groove at spaced locations.

5. A frame as in claim 4, wherein said shell member is deformed at each of said locations by forming longitudinal circumferentially spaced cuts in said shell member and bending the sections of said shell member between said cuts inwardly toward the axis of said shell member.

6. A frame as in claim 5, wherein said cuts extend to the end of said shell member which receives said end member, and said sections are in tight engagement with said axially inner surface of said groove.

7. A frame as in claim 4, wherein spaced axially extending cuts are formed in said shell, and circumferential cuts are formed in said shell joining pairs of adjacent axial cuts, and the sections of said shell defined by said cuts are bent into engagement with said axially inner surface of said groove.

8. A frame as in claim 7, wherein said axial and circumferential cuts are formed before assembly of said members.

9. A frame as in claim 7, wherein said axial and circumferential cuts are formed after assembly of said members.

10. A frame as in claim 4, wherein uncut spaced portions of said shell are deformed into said groove.

11. A frame as in claim 4, wherein portions of said shell are deformed into tight overlapping engagement with the axially inner surface of said grooves.

References Cited by the Examiner

UNITED STATES PATENTS

| | | | |
|---|---|---|---|
| 2,654,848 | 10/1953 | Schaefer | 310—87 |
| 2,798,173 | 7/1957 | Penlington | 310—87 |
| 2,967,346 | 1/1961 | McMaster | 310—42 |
| 2,993,132 | 7/1961 | Luenberger | 310—87 |
| 3,041,976 | 7/1962 | Maynard | 310—87 |
| 3,116,432 | 12/1963 | Ebey | 310—87 |

MILTON O. HIRSHFIELD, *Primary Examiner.*

J. W. GIBBS, *Assistant Examiner.*